United States Patent

[11] 3,584,299

| | | |
|---|---|---|
| [72] | Inventor | Frank Csete<br>Willow Grove, Pa. |
| [21] | Appl. No. | 841,022 |
| [22] | Filed | July 11, 1969 |
| [45] | Patented | June 8, 1971 |
| [73] | Assignee | Sun Oil Company<br>Philadelphia, Pa. |

[54] HOOK-ON POWER FACTOR, VOLT AND AMPERE METER
14 Claims, 4 Drawing Figs.

[52] U.S. Cl. .................................... 324/86,
324/73, 324/115, 324/127
[51] Int. Cl. ..................................... G01r 25/00,
G01r 15/12
[50] Field of Search ........................... 324/127,
86, 107, 73, 108, 115

[56] References Cited
UNITED STATES PATENTS

| | | | |
|---|---|---|---|
| 2,266,624 | 12/1941 | Hall | 324/115 |
| 2,519,071 | 8/1950 | Rowell | 324/86 |
| 2,583,798 | 1/1952 | Rowell et al. | 324/86 |

*Primary Examiner*—Rudolph V. Rolinec
*Assistant Examiner*—Ernest F. Karlsen
*Attorneys*—George L. Church, Donald R. Johnson, Wilmer E. Mc Corquodale, Jr. and Frank A. Rechif ABSTRACT: The split magnetic core or hook-on magnetic core of an alternating current measuring apparatus carries two separate and independent coils. By hooking the core on one-phase conductor of a three-phase electrical circuit and by supplying one coil with compensating current derived from the other phase conductors, the power factor of the circuit may be read on a meter connected to the other coil. By means of a suitable switching system, the core-coil-meter arrangement may also be used to measure either voltage or current in single-phase or polyphase circuits.

PATENTED JUN 8 1971 3,584,299

TO TERMINAL T12 (FIG.1)

ALL OTHER
CONNECTIONS SAME
AS IN FIG. 1

TO TERMINAL T11 (FIG.1)

INVENTOR:
FRANK CSETE
BY Donald R. Johnson
ATTY.

HOOK-ON POWER FACTOR, VOLT AND AMPERE METER

This invention relates to hook-on or clip-on measuring apparatus for alternating currents, and more particularly to apparatus of this type which can be used selectively for measuring power factor, voltage, or current.

Hook-on or clip-on-type instruments for metering alternating current and voltage are very well known, and are frequently used in the industry. Also, instruments of this type have occasionally been proposed for the measurement of power factor. These hook-on or clip-on instruments are extremely useful when metering must be done without circuit interruption.

In surveys of power systems, power factor measurement is rather important. With power factor data at hand, the kilowatt loading of motors, transformers, etc. can be calculated, as can the size of capacitors for power factor improvement. Also, with a power factor meter the phase rotation of the power supply can be easily determined, which determination is essential for the proper connection of motors, for the proper paralleling of transformers, and for transferring operations.

When in power factor use, the apparatus of this invention may be employed to measure leading or lagging power factor of a polyphase (specifically, a three-phase) electrical circuit. In addition, the apparatus of this invention may be used alternatively to measure voltage or current in a single phase or polyphase electrical circuit.

The apparatus of this invention employs a current meter adapted (when used to measure power factor) to be energized by the vectorial sum of two currents, one of which is derived from one of the phase conductors by a hook-on-type of magnetic circuit having a pickup coil mounted thereon, and the other of which is derived from the other two phase conductors; the last-named current is a compensating current which is fed to a coil also mounted on the hook-on magnetic circuit. When used to measure current, the hook-on magnetic circuit is used simply as a current transformer, and the compensating coil is short-circuited. When used to measure voltage, the hook-on magnetic circuit is unhooked from the phase conductor and its core is used as a potential transformer, with the pickup coil being used as a primary winding and the compensating coil as a secondary winding. For each of the three different types of measurement, one of the two coils associated with the hook-on magnetic circuit is connected to the current meter. The entire apparatus of this invention is preferably built as a self-contained unit.

The features of this invention which are believed to be novel and patentable will be pointed out in the claims appended hereto. For better understanding of the invention, reference will be made in the following description to the accompanying drawing, wherein:

Figure 1:
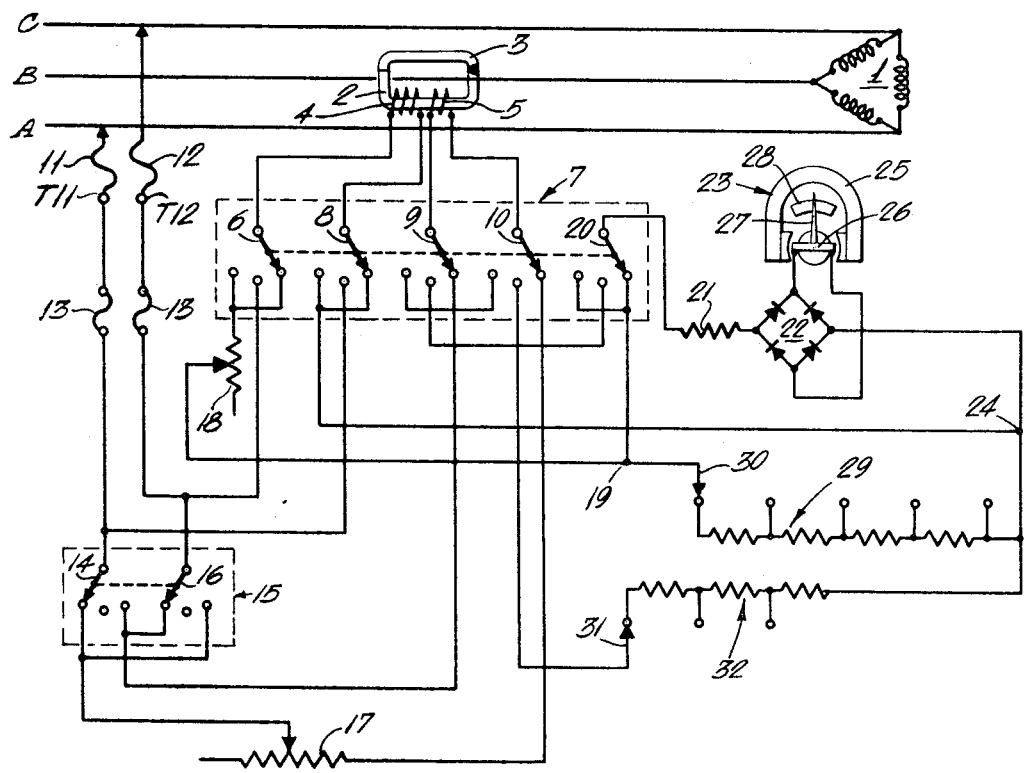
FIG. 1 is a circuit diagram of one form of apparatus according to this invention.

Referring now to FIG. 1, the lines denoted A, B, and C represent a three-phase power supply and 1 a load which is supplied thereby. A hook-on or clip-on core, the hinged magnetic core parts of which are shown at 2 and 3, is illustrated as hooked on or clipped on the phase conductor B, so as to be responsive to the current in this phase conductor. By way of example, this hook-on core may be constructed somewhat as disclosed in U.S. Patent No. 2,519,071.

Two separate coils or windings 4 and 5 are carried by core 2,3, which is to say that they are inductively coupled to this split core. One end of metering coil 4 is connected to the movable arm 6 in the first deck of a five deck, three-position selector switch 7, while the other end of this coil is connected to the movable arm 8 in the second deck of switch 7. One end of compensating coil 5 is connected to the movable arm 9 in the third deck of selector switch 7, while the other end of this coil is connected to the movable arm 10 in the fourth deck of the selector switch.

The apparatus of this invention includes a pair of flexible electrical leads 11 and 12 having probes or spring clips at their outer or free ends, whereby these ends of the leads 11 and 12 may be electrically connected respectively to the two remaining phase conductors, that is, to the two of the three conductors which remain after exclusion of the one to which the hook-on magnetic core 2,3 is hooked. In FIG. 1, since core 2,3 is hooked onto phase conductor B, the ends of the leads 11 and 12 are connected to phase conductors A and C, respectively. In connection with the expression "free ends," it is desired to be pointed out that all of the components of FIG. 1 except, of course, the load 1, are preferably housed in a casing of the sort disclosed in the patent previously cited, and the probe clip ends of leads 11 and 12 extend outwardly from this casing, so that they can be connected to the phase conductors; the magnetic circuit 2,3 extends through the upper wall of the casing and the knobs for operating the various switches and variable resistors are accessible from outside the casing.

Figure 4:
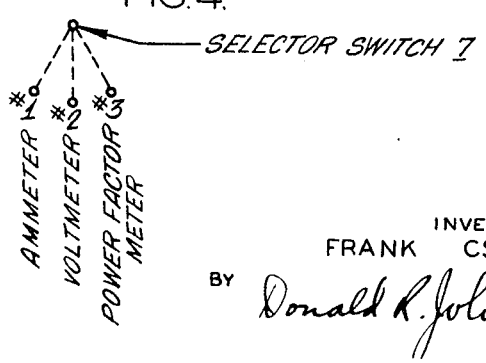
FIG. 4 is a diagrammatic illustration showing the position assignments of the metering-mode-selector switch.

The leads 11 and 12 are connected to individual fuses indicated at 13, which are inside the aforementioned casing. Lead 11 is connected through terminal T11 and through its fuse 13 to one pole or arm 14 of a double-pole, double-throw "center off" phase reversing switch 15, while lead 12 is connected through terminal T12 and through its fuse 13 to the other pole or arm 16 of switch 15. In the illustrated position of switch 15, lead 11 is connected through a variable resistor 17 (used for adjustment of the compensating current) to the 03 contact of switch arm 10 (and thus to the right-hand end of compensating coil 5 when switch 7 is in its 03 position as illustrated), while lead 12 is connected directly to the 03 contact of switch arm 9 (and thus to the left-hand end of compensating coil 5 when switch 7 is in its 03 position). (Reference may be had to FIG. 4 for the position assignments of selector switch 7.) In the "center off" position of switch 15, the inner ends of leads 11 and 12 are both open-circuited or unconnected. In the "reverse" position of switch 15, lead 11 would be connected directly to the 03 contact of switch arm 9 (left-hand end of coil 5), while lead 12 would be connected through the variable resistor 17 to the 03 contact of switch arm 10 (right-hand end of coil 5). Thus, it may be seen that operation of switch 15 from one of its two end positions to the other reverses the phase sense of the current derived from phase conductors A and C and fed to the compensating coil 5.

The 01 position of selector switch 7 sets up the apparatus of this invention for the measurement of current in amperes, that is, sets up such apparatus as an ammeter. The 02 position switch 7 sets up the apparatus of this invention as a voltmeter, for the measurement of voltage. The 03 position of switch 7 sets up the apparatus as a power factor meter, to measure the power factor of a three-phase load. See FIG. 4. The setup as a power factor meter will first be described.

In the 03 position of switch 7, one end of metering coil 4 is connected (by way of arm 6) through a variable resistor 18 (used for full-scale adjustment) to a circuit point 19, and this latter point is connected to the 03 contact for the movable arm 20 in the fifth deck of switch 7. Arm 20 is connected through a fixed resistor 21 to one input terminal of a bridge rectifier 22 for a DC ammeter denoted generally by numeral 23. The other end of metering coil 4 is connected (by way of arm 8) to circuit point 24 at the other input terminal of rectifier 22, this last-mentioned terminal being diagonally opposite to the input terminal previously mentioned (to which one end of resistor 21 is connected).

The meter 23 is provided with a cylindrical iron core in the airgap of a permanent magnet 25 and a single moving coil 26 surrounding such core in such airgap, and with a pointer 27 attached to the moving coil and cooperating with a scale 28, which latter will be referred to more in detail hereinafter. The two ends of moving coil 26 are connected to the respective output terminals of the bridge rectifier 22.

As described, in the 03 position of switch 7 the coil 4 provides the input for meter 23. If we neglect for the moment the effect of coil 5, coil 4 acts as the secondary winding of a conventional current transformer which is coupled to phase conductor B, and the meter 23 measures the current $I_B$ in phase B.

Figure 2:
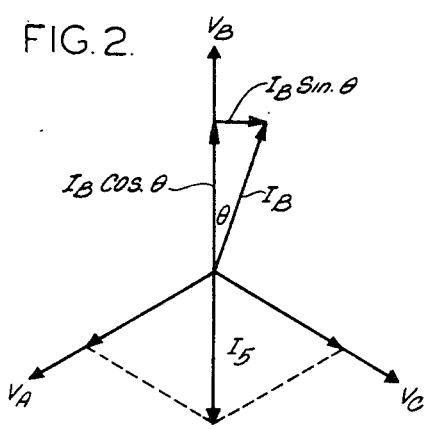
FIG. 2 is a vector diagram explanatory of the manner of one mode of operation of the apparatus of FIG. 1.

Refer now to the vector diagram, FIG. 2, which represents the vectorial relations for the power factor meter setup being described (switch 7 in the 03 position). If the load 1 is inductive, such as an induction motor, the current $I_B$ in phase B will lag behind the phase voltage $V_B$ by the angle $\theta$. The vector $I_B$ has two components: (1) the "watt" component, $I_B \cos \theta$ (the cosine of $\theta$ being the power factor), (2) the "wattless" or reactive component, $I_B \sin \theta$.

The current $I_s$ in the compensating coil 5 is derived from both of the phase voltages $V_A$ and $V_C$, and is the result of a vectorial addition of these voltages. It is assumed that the coil 5 presents a purely resistive load, which is a reasonable assumption under the circumstances. With proper phasing, the current vector $I_s$ will be shifted 180° from the "watt" component vector $I_B \cos \theta$, as illustrated in FIG. 2. The proper phasing can be easily achieved by means of the phase reversing switch 15 of FIG. 1. By adjusting the resistance 17, the magnitude of $I_s$ can be increased or decreased. If $I_s$ equals $I_B \cos \theta$ and is at 180° thereto, that is, if the compensating current $I_s$ is equal in magnitude and opposite in phase to the "watt" component, only the reactive component $I_B \sin \theta$ will flow in the metering coil 4. At that point, the deflection of meter 23 will be a minimum. If $I_s$ is further increased, the compensating current will exceed $I_B \cos \theta$, and the meter deflection will start to increase.

At this juncture, it should be made clear that the current in coil 4 which results from phase B pickup alone is proportional to $I_B$, and that the compensating current $I_s$ is vectorially added thereto by means of core 2,3, to which the coils 4 and 5 are both coupled.

For convenience, a power factor scale is added at 28 to the meter 23, this scale having "0" at maximum meter deflection and "1" at no deflection. Since at the balance point ($I_s$ balanced against $I_B \cos \theta$) only the reactive component $I_B \sin \theta$ flows in the metering coil 4 (and in the meter 23), it follows that the meter deflection is actually proportional to the decimal value of $\sin \theta$, but the meter scale is calibrated with the values of $\cos \theta$. The result is an expanded scale in the range of the most practical limits, between 0.4 and unity power factor.

To measure the power factor, the first step is to set the phase reversing switch 15 at its center "off" position, and then vary resistor 18 to bring the meter deflection to its maximum (zero end of the power factor scale). Then, the phase reversing switch 15 is put in the proper one of its two "on" positions, and resistor 17 is varied to adjust the meter deflection to its minimum. The power factor can then be read directly on the power factor scale, at the minimum meter deflection.

When switch 7 is in its 01 position, the apparatus is setup for operation as an ammeter, to measure current. In this mode, one end of coil 4 is connected through arm 6 and its 01 contact to resistor 18, and through this resistor to point 19, then through the 01 contact of arm 20 and this arm to the bridge rectifier 22, as before; the other end of coil 4 is connected through arm 8 and its 01 contact to bridge rectifier input terminal 24, as before. The coil 5 is short-circuited through arms 9 and 10, which are both now on their 01 contacts. A tapped resistor, denoted generally by numeral 29, is provided as a shunt across the meter input points 19 and 24. A movable contact 30, connected to point 19, cooperates with the taps on resistor 29 (five taps are illustrated) to provide several ranges of metering, such as full scale values of 5, 15, 60, 150, and 600 amperes, for example.

When switch 7 is in its 01 position, coil 5 is short-circuited and coil 4 is connected to the meter 23. The hook-on core 2,3 then operates as a conventional current transformer, to meter the current $I_B$ in phase conductor B. Several ampere scales, running upwardly from zero at no meter deflection and having the upper values given above by way of example in connection with the taps on resistor 29, may be provided at 28 on the meter 23.

When switch 7 is in its 02 position, the apparatus is set up for operation as a voltmeter. For this mode, the core 2,3 would be unhooked from phase conductor B and would not be hooked to any phase conductor. In this mode, one end of coil 4 is connected by way of arm 6 and its 02 contact to lead 12, and the other end of coil 4 is connected by way of arm 8 and its 02 contact to lead 11. One end of coil 5 is connected by way of arm 9 and its 02 contact to the 02 contact of arm 20, and through this latter arm to one input terminal of meter rectifier 22. The other end of coil 5 is connected by way of arm 10 and its 02 contact to a movable contact 31 which cooperates with the taps (three taps being illustrated) on a tapped series resistor 32 the right-hand end of which is connected to the other input terminal 24 of meter 23.

The taps on the series resistor 32 correspond to voltages of 600, 300, and 150, reading from left to right.

When switch 7 is in its 02 position, the core 2,3 is used as a potential transformer, coil 4 being the primary winding and coil 5 being the secondary winding. The voltage on coil 5 (which is connected to the meter 23) is proportional to the voltage between the phase conductors to which the respective leads 11 and 12 are connected (these being phase conductors A and C in FIG. 1), so the meter 23 can be readily calibrated for a "volts" scale at 28. Several volts scales, running upwardly from zero at no meter deflection and having the upper values given above by way of example in connection with the taps on resistor 32, may be provided at 28 on the meter 23.

It is pointed out that when measuring voltage a group of resistors has to be selected (with the help of contact 31, operating on resistor 32) to correspond with the line voltage, before connecting leads 11 and 12 to the potential points (such as phase conductors A and C).

It may be seen that in FIG. 1 the leads 11 and 12 are coupled to the respective phase conductors A and C by means of direct, mechanical connections. This may be undesirable in some situations (e.g., when working in hazardous environments), since there is a possibility of sparking with this type of electrical connections. An explosion proof manner of making the electrical connections for power factor measurement will now be disclosed. See FIG. 3.

As in FIG. 1, the hook-on or clip-on core 2,3 carries the two coils or windings 4 and 5, the ends of coil 4 being connected to the movable arms 6 and 8, respectively, and the ends of coil 5 being connected to the movable arms 9 and 10, respectively, these movable arms 6, 8, 9, and 10 being in respective decks of the selector switch 7; in FIG. 3, the core 2,3 is again illustrated as being "clamped" on phase conductor B.

Figure 3:
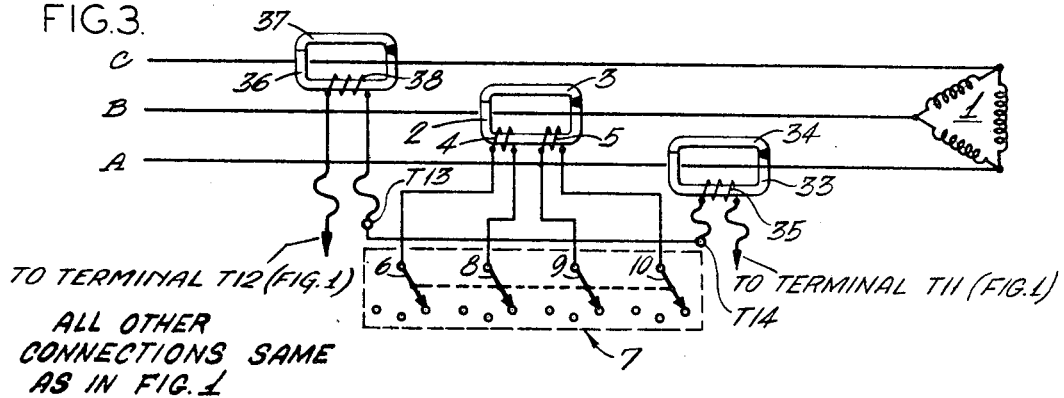
FIG. 3 is a partial circuit diagram of a modified apparatus.

In FIG. 3, instead of using the leads 11 and 12 with their probe or clip ends as pickups for the phase conductors A and C, current transformers are used. A hook-on or clip-on core, the hinged magnetic core parts of which are shown at 33 and 34, is hooked on the phase conductor A, so as to be responsive to the current in this phase conductor; core 33,34 carries a coil or winding 35. A hook-on or clip-on core, the hinged magnetic core parts of which are shown at 36 and 37, is hooked on the phase conductor C, so as to be responsive to the current in this phase conductor; core 36,37 carries a coil or winding 38. The cores 33,34 and 36,37 are generally similar to core 2,3 previously described, except of course that each of the former carries only a single coil.

One end of coil 38 is connected through terminal T12 to arm 16 of switch 15 (not shown in FIG. 3), and (assuming switch 15 is in the position illustrated in FIG. 1) thence to the 03 contact of switch arm 9, and the other end of this coil is connected through terminals T13 and T14 to one end of coil 35. The remaining end of coil 35 is connected through terminal T11 to arm 14 of switch 15, and (again assuming switch 15 is in the FIG. 1 position) thence through variable resistor 17 (not shown in FIG. 3) to the 03 contact of switch arm 10.

In FIG. 3, if the phase reversing switch 15 (FIG. 1) were in its other "on" position, the left-hand end of coil 38 would be connected through terminal T12 and through this switch to variable resistor 17 and thence to the 03 contact of switch arm 10; the right-hand end of coil 35 would be connected through terminal T11 and through switch 15 to the 03 contact of switch arm 9.

Coil 35 acts as the secondary winding of a conventional current transformer which is coupled to phase conductor A, and coil 38 acts as the secondary winding of a conventional current transformer which is coupled to phase conductor C. The currents in coils 35 and 38 are added together as a result of the series connection of these coils, and the vectorial sum is $I_s$ (FIG. 2) which is fed to the compensating coil 5. The magnitude of $I_s$ is adjustable (for balance with $I_B \cos \theta$, as in the FIG. 1 embodiment) by means of the variable resistance 17. The operation of the FIG. 3 embodiment for power factor measurement is otherwise exactly the same as previously described in connection with FIG. 1.

What I claim is:

1. In apparatus for the metering of electrical quantities in a three-phase circuit, a current transformer having a core magnetized in accordance with the current in a first phase of a three-phase circuit; a compensating winding inductively coupled to said core, means for supplying to said winding a current derived from the second and third phases of said three-phase circuit and having a 180° phase relation to the watt-component of said first phase current, a secondary winding inductively coupled to said core, and means for utilizing the resultant current induced in said secondary winding from said core for measuring power factor when the current derived produces a flux equal and opposite the flux produced by the watt component in the core.

2. Apparatus of claim 1, wherein said core is of the hook-on-type having a pair of hingedly connected core parts.

3. Apparatus defined in claim 1, wherein said last-mentioned means comprises a current-responsive meter having a pointer which cooperates with a fixed scale.

4. Apparatus according to claim 1, wherein said first-mentioned means includes adjustable means for varying the magnitude of the current supplied to the compensating winding.

5. Apparatus according to claim 1, wherein said first-mentioned means includes switching means operable to reverse the phase sense of the current supplied to the compensating winding.

6. Apparatus set forth in claim 5, wherein said first-mentioned means also includes adjustable means for varying the magnitude of the current supplied to the compensating winding.

7. Apparatus according to claim 1, wherein said first-mentioned means includes adjustable means for varying the magnitude of the current supplied to the compensating winding, and wherein said last-mentioned means comprises a current meter having a pointer which cooperates with a fixed scale.

8. Apparatus according to claim 7, wherein said first-mentioned means also includes switching means operable to reverse the phase sense of the current supplied to the compensating winding.

9. A multifunction apparatus for the metering of electrical quantities in a three-phase circuit, comprising a hook-on magnetic core for hooking onto one phase conductor and carrying a first winding and a second winding; a pair of leads for connecting respectively to the other two phase conductors, a current meter having two input terminals; and a multiposition switch operative in a first position to connect said pair of leads to respective opposite ends of said second winding and to connect the opposite ends of said first winding to respective ones of said meter input terminals, said first position being one wherein the core is coupled to a phase conductor, and operative in a second position to short circuit said second winding and to connect the opposite ends of said first winding to respective ones of said meter input terminals said second position being one wherein the core is coupled to a phase conductor.

10. Apparatus according to claim 9, wherein said switch is operative in a third position to connect said pair of leads to respective opposite ends of said first winding and to connect the opposite ends of said second winding to respective ones of said meter input terminals, said third position being one wherein the core is not coupled to a phase conductor.

11. Apparatus defined in claim 10, including also a variable resistance connected in series with said second winding when said switch is in its third position.

12. Apparatus defined in claim 9, including also a variable resistance connected in series with said second winding when said switch is in its first position.

13. Apparatus defined in claim 12, including also a phase reversing switch connected in series with said variable resistance and said second winding when said switch is in its first position.

14. Apparatus defined in claim 9, including also a variable shunt resistance connected across said meter input terminals when said switch is in its second position.